United States Patent
Leiserson et al.

(10) Patent No.: US 11,057,368 B2
(45) Date of Patent: Jul. 6, 2021

(54) ISSUING A CERTIFICATE BASED ON AN IDENTIFICATION OF AN APPLICATION

(71) Applicant: Fortanix, Inc., Mountain View, CA (US)

(72) Inventors: Andrew Leiserson, San Francisco, CA (US); Jethro Gideon Beekman, San Francisco, CA (US); Manas Agarwal, Uttar Pradesh (IN)

(73) Assignee: Fortanix, Inc., Mountain View, CA (US)

( * ) Notice: Subject to any disclaimer, the term of this patent is extended or adjusted under 35 U.S.C. 154(b) by 230 days.

(21) Appl. No.: 16/040,153

(22) Filed: Jul. 19, 2018

(65) Prior Publication Data

US 2020/0028842 A1    Jan. 23, 2020

(51) Int. Cl.
*H04L 29/06* (2006.01)
*H04L 9/32* (2006.01)
*H04L 9/00* (2006.01)

(52) U.S. Cl.
CPC .......... *H04L 63/0823* (2013.01); *H04L 9/006* (2013.01); *H04L 9/321* (2013.01); *H04L 9/3236* (2013.01); *H04L 9/3247* (2013.01); *H04L 63/20* (2013.01)

(58) Field of Classification Search
CPC ... H04L 63/0823; H04L 9/3236; H04L 9/006; H04L 9/321; H04L 63/20; H04L 9/3247; H04L 9/3268; H04L 9/3239; H04L 63/0272; H04L 63/10; G06F 16/9014
USPC .......................................................... 713/156
See application file for complete search history.

(56) References Cited

U.S. PATENT DOCUMENTS

| | | | | |
|---|---|---|---|---|
| 9,152,793 | B2 * | 10/2015 | Futral | G06F 12/1408 |
| 9,680,872 | B1 * | 6/2017 | Roth | G06F 21/57 |
| 2004/0039911 | A1 * | 2/2004 | Oka | G06Q 30/06 |
| | | | | 713/175 |
| 2006/0143700 | A1 * | 6/2006 | Herrmann | H04L 63/166 |
| | | | | 726/14 |
| 2014/0052993 | A1 * | 2/2014 | Isozaki | H04L 63/0428 |
| | | | | 713/175 |
| 2015/0326586 | A1 * | 11/2015 | Khesin | H04L 63/145 |
| | | | | 726/1 |
| 2019/0305959 | A1 * | 10/2019 | Reddy | G06F 8/60 |
| 2020/0028842 | A1 * | 1/2020 | Leiserson | H04L 9/3247 |
| 2020/0204369 | A1 * | 6/2020 | Shi | H04L 67/141 |

* cited by examiner

*Primary Examiner* — Farid Homayounmehr
*Assistant Examiner* — Sanchit K Sarker
(74) *Attorney, Agent, or Firm* — Lowenstein Sandler LLP

(57) ABSTRACT

A request to issue a digital certificate may be received. A hash value corresponding to an application that has provided the request for the digital certificate may be identified. A determination may be made as to whether the hash value corresponding to the application matches with a known hash value. In response to determining that the hash value corresponding to the application matches with the known hash value the digital certificate may be issued to the application.

16 Claims, 6 Drawing Sheets

ISSUING A CERTIFICATE BASED ON AN IDENTIFICATION OF AN APPLICATION

TECHNICAL FIELD

Aspects of the present disclosure relate generally to certificates, and more specifically, relate to issuing a certificate based on an identification of an application.

BACKGROUND

A certificate authority (CA) may issue digital certificates for other entities. For example, an issued digital certificate may include a public key of a particular entity. The certificate authority may further sign the digital certificate with the private key of the certificate authority. The digital certificate may be used to verify that the public key included in the digital certificate is owned by the particular entity. For example, when the particular entity provides the issued digital certificate to another entity, the other entity may verify the signature of the certificate authority. If the signature is successfully verified, then the other entity may use the public key included in the digital certificate to securely communicate with the particular entity.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
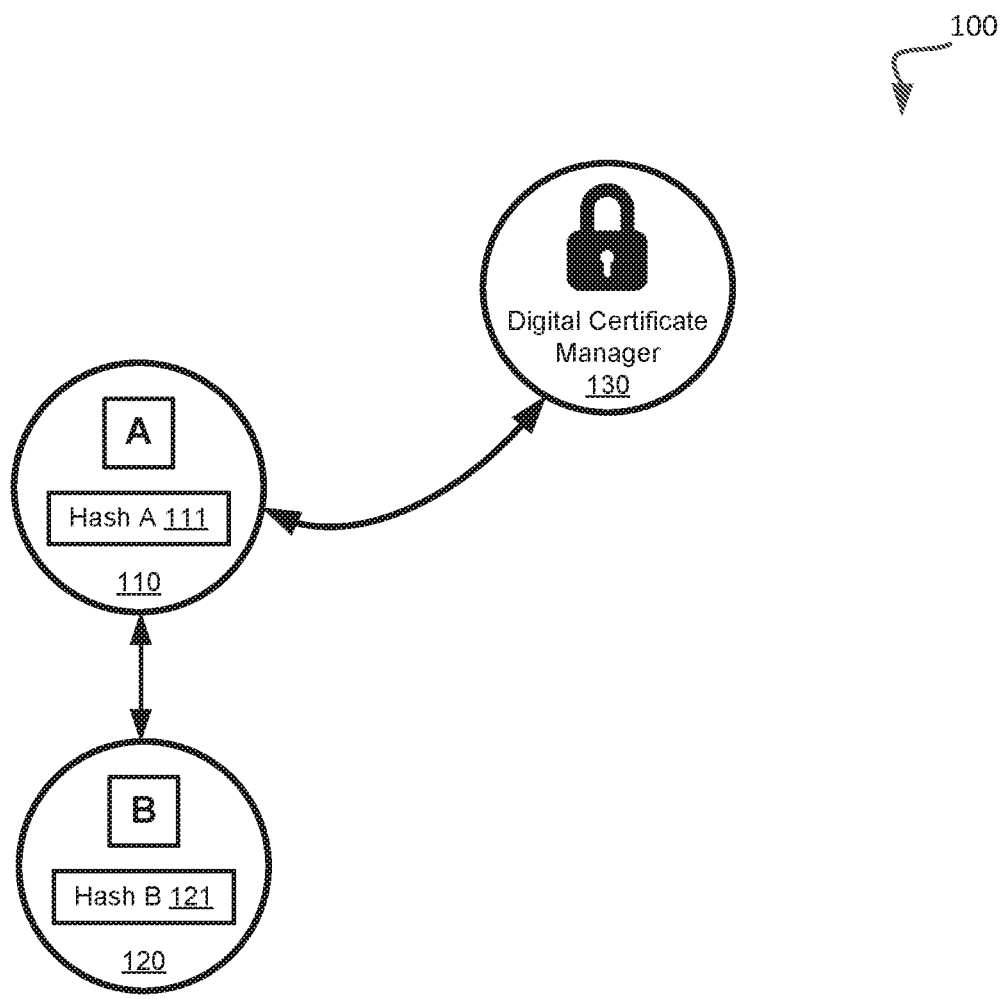
FIG. 1 illustrates an example computing environment to issue a digital certificate based on an identification of an application in accordance with some embodiments.

Aspects of the present disclosure relate to issuing a digital certificate based on an identification of an application. In general, a digital certificate may be used to establish secure communication between two entities (e.g., two applications or computing devices over a network). For example, an entity may provide a digital certificate to another entity. The digital certificate may include the public key of the entity providing the digital certificate. For example, the other entity may receive the digital certificate and use the included public key to encrypt data that is transmitted to the entity that provided the digital certificate. Subsequently, the entity may use a corresponding private key to decrypt the data.

In a computing environment, the entities may correspond to different applications or processes (i.e., secure enclaves) that are provided by one or more network servers. A first application and a second application may seek to establish a secure communication channel between the corresponding applications. For example, the first application may provide a digital certificate to the second application. The digital certificate may include a public key of the first application that may be used to encrypt data from the second application. Subsequently, the encrypted data may be provided from the second application to the first application by using the public key that is included in the received digital certificate. Similarly, the second application may provide another digital certificate that includes another public key of the second application that may be used by the first application to encrypt data that is to be provided to the second application.

In order to verify the identity of the owner of the public key that is included in a digital certificate, a hash value for the first application that provided the digital certificate may be used by the second application. The hash value may be based on the execution code of the first application. The digital certificate may include the hash value of the first application and the second application may also store a known hash value of the first application. Thus, if the hash value included in the digital certificate matches the known hash value of the first application, then the second application may use the public key included in the digital certificate when transmitting data to the first application.

If the execution code of the first application changes, then the hash value of the execution code of the first application also changes. The execution code of the second application may thus also be changed to store the changed hash value of the first application so that the second application can verify a digital certificate from the first application. As a result, a change to the execution code of the first application may also result in a change to the execution code of the second application. Additionally, if a mutual secure communication is to be established between the first application and the second application (e.g., each of the applications provides its digital certificate to the other application), then the changing of the execution code of the first application will also result in a change to the execution code of the second application so that the first application and the second application may not be able to simultaneously include the changed hash value of the other application.

Aspects of the present disclosure address the above and other deficiencies by using a digital certificate manager to issue a digital certificate based on an identification of an application. For example, the digital certificate manager may correspond to another application or process provided in a secure enclave and may act as a certificate authority (CA) to issue or provide the digital certificate to another application. The digital certificate manager may be a trusted entity that digitally signs the digital certificate with a CA private key and each application may store the corresponding CA public key that may be used to verify the digital signature of the digital certificate manager that is included in the digital certificate.

The digital certificate manager may receive a certificate signing request from an application. The certificate signing request may include a public key of the application and a hash value of the application. The digital certificate manager may subsequently verify that the hash value of the application from the certificate signing request matches with a known hash value of the application. If the hash values match, then the digital certificate manager may issue a digital certificate that includes the public key from the application. The digital certificate may be signed by the CA private key of the digital certificate manager. The application may then transmit the digital certificate to another application to establish a secure communication of data between the applications. The other application may verify the digital signature of the digital certificate manager by using a stored CA public key that corresponds to the CA private key and may then use the included public key to securely communicate with the application. Similarly, the other application may also provide a certificate signing request to the digital certificate manager and a corresponding digital certificate may be issued to the other application if the included hash value of the other application matches with a known hash value of the other application at the digital certificate manager. As such, the known hash values of the applications may not be stored at the execution code of each corresponding application and may instead be updated and stored at the digital certificate manager.

Advantages of the present disclosure include, but are not limited to, less down time for applications and increased security for communications between applications. For example, since the digital certificate manager may be updated to store known hash values of applications and uses the hash values to issue subsequent digital certificates, other applications may not be halted and updated to store any changed hash values. As a result, the applications may be provided for longer uninterrupted times. Additionally, applications may use the digital certificates and trust that the public key that is included in a particular digital certificate belongs to the entity identified in the digital certificate.

FIG. 1 illustrates an example computing environment 100 to issue a digital certificate based on an identification of an application. In general, the computing environment 100 may include a digital certificate manager 130 that issues a certificate to an application based on an identification of the application.

As shown in FIG. 1, a first application 110 (e.g., application 'A') may interact with a second application 120 (e.g., application 'B'). In some embodiments, the applications may correspond to different processes or be executed within different secure enclaves as described in further detail with respect to FIG. 5. The first application 110 may communicate with the application 120 by transmitting and receiving data between the applications. The first application 110 may provide a digital certificate to the application 120 in order to establish a secure communication between the first application 110 and the second application 120. In some embodiments, the secure communication may correspond to a Transport Layer Security (TLS) protocol or a mutual TLS protocol. When the first application 110 is initiated, then the first application 110 may provide a request to the digital certificate manager 130 for the digital certificate manager 130 to issue a digital certificate to the first application 110. The request may be a certificate signing request that includes, but is not limited to, a public key of the first application 110 and a hash value 111 of the execution code of the first application 110. The digital certificate manager 130 may receive the certificate signing request and may determine whether the hash value 110 in the certificate signing request matches with a known hash value stored at the digital certificate manager 130. If the hash values match, then the digital certificate manager 130 may issue a digital certificate to the first application 110. The digital certificate may include, but is not limited to, the public key of the first application 110 and may be signed by the digital certificate manager 130. Subsequently, the first application 110 may provide the issued digital certificate to the second application 120 to establish secure communication with the second application 120.

In some embodiments, the second application 120 may also provide a certificate signing request to the digital certificate manager 130. For example, the certificate signing request may include the public key of the second application 120 as well as the hash value 121 of the second application 120. The digital certificate manager 130 may then also provide another digital certificate to the second application 120 if the hash value 121 matches a known hash value stored at the digital certificate manager 130.

Figure 2:
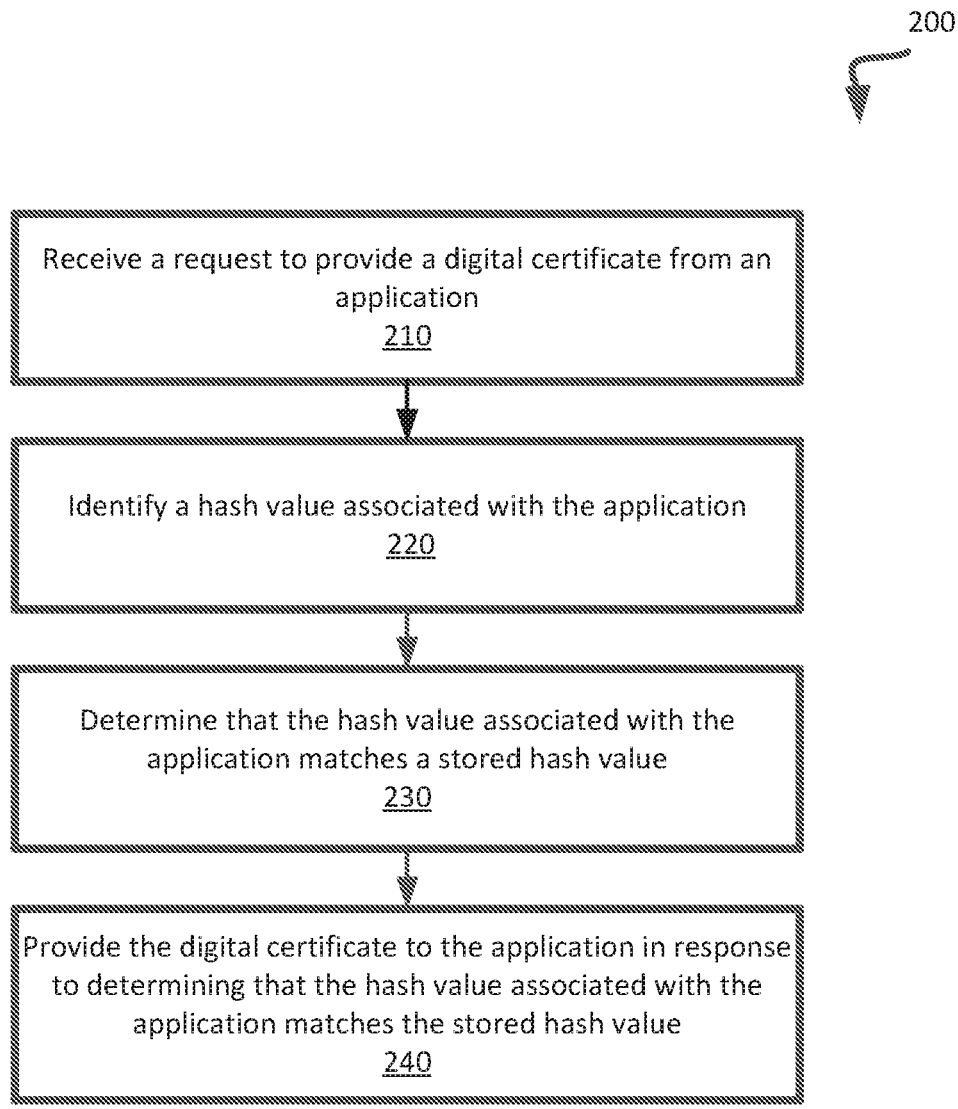
FIG. 2 is a flow diagram of an example method to issue a digital certificate based on a hash value associated with an application in accordance with some embodiments of the present disclosure.

FIG. 2 is a flow diagram of an example method 200 to issue a digital certificate based on a hash value associated with an application. In general, the method 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 may be performed by the digital certificate manager 130 of FIG. 1.

For simplicity of explanation, the methods of the present disclosure are depicted and described as a series of acts. However, acts in accordance with the present disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

As shown in FIG. 2, the method 200 may begin with processing logic receiving a request to provide a digital certificate from an application (block 210). For example, a certificate signing request may be received from the application. As described in further detail below with respect to FIG. 3, the certificate signing request may include a public key of the application, a hash value of the execution code of the application, an attestation value, and an identification of a network domain of the application. In some embodiments, the request to provide the digital certificate may be received from the application when the application is initialized or started. The processing logic may further identify a hash value associated with the application (block 220). For example, the hash value may be a hash value of the execution code of the application that is included in the certificate signing request. In some embodiments, the hash value may be generated by a hash function that maps data of arbitrary size (e.g., the programming or execution code of the application) to data of a fixed size (e.g., the hash value). The hash value may change when the execution code of the application changes. The processing logic may further determine that the hash value associated with the application matches a stored hash value (block 230). For example, the digital certificate manager may include a data structure (e.g., a table or a database) that identifies applications and the known hash values for the applications. In some embodiments, the known hash values may be provided to the digital certificate manager by a system administrator (e.g., a user who manages a network server providing the application and/or the digital certificate manager) and/or may be transmitted to the digital certificate manager when an application is updated or changed. Since the digital certificate manager may be used to provide digital certificates to multiple applications, the data structure at the digital certificate manager may identify multiple applications and corresponding known hash values for each of the different applications.

Referring to FIG. 2, the processing logic may provide the digital certificate to the application in response to determining that the hash value associated with the application matches the stored hash value (block 240). For example, if the hash value of the execution code of the application matches with a known hash value of the application stored at the digital certificate manager, then the digital certificate manager may issue or transmit a digital certificate to the application. As described in further detail with respect to FIG. 3, the digital certificate may include a public key of the application and may be signed by the digital certificate manager.

As such, when an application (or another such process or secure enclave) is initiated, a request for a digital certificate may be provided to another process (e.g., the digital certificate manager that may be provided by another secure enclave). A hash value provided by the application may be compared with known hash values of applications and the digital certificate manager may issue a digital certificate to the application if the hash values match. Otherwise, if the hash value provided by the application does not match with a known hash value stored at the digital certificate manager, then the digital certificate manager may not issue a digital certificate to the application that has requested the digital certificate.

Figure 3:
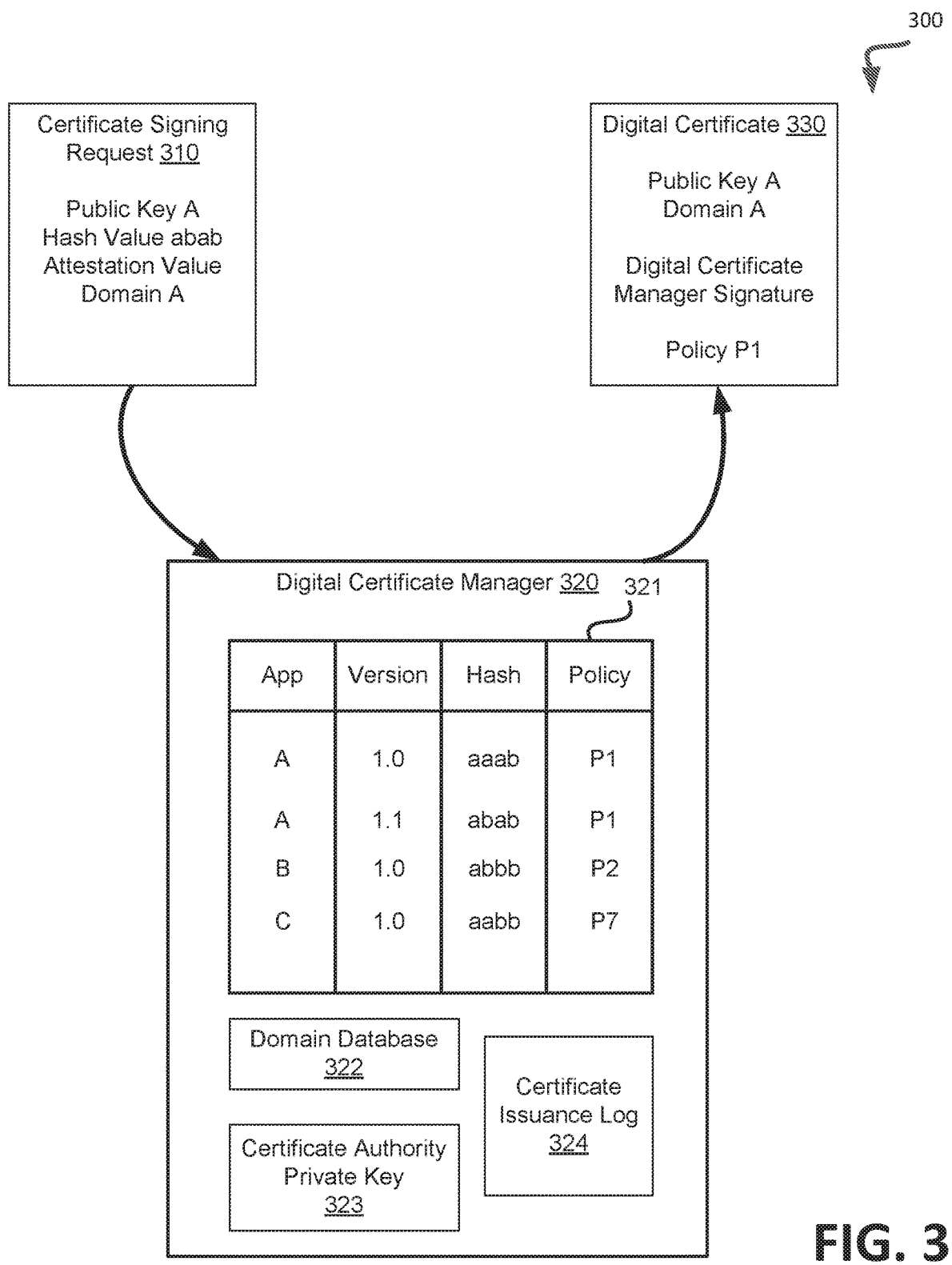
FIG. 3 illustrates a block diagram of a computing environment to issue a digital certificate based on a hash value associated with an application in accordance with some embodiments of the present disclosure.

FIG. 3 illustrates a block diagram of a computing environment 300 to issue a digital certificate based on a hash value associated with an application. In general, the computing environment 300 may include a digital certificate manager 320 that may correspond to the digital certificate manager 130 of FIG. 1.

As shown in FIG. 3, the computing environment 300 may include a digital certificate manager 320 that may receive a certificate signing request 310 and may generate or issue a digital certificate 330. The certificate signing request (CSR) 310 may include information from an application that has provided the CSR 310 to the digital certificate manager 320. For example, the CSR 310 may include, but is not limited to, a public key of the application that has provided the CSR 310, a hash value provided by the application, an attestation value, and/or an identification of a network domain of the application. The application may transmit the CSR 310 to the digital certificate manager 320 over a network. The CSR 310 may be provided to the digital certificate manager 320 so that the digital certificate 330 may be issued to the application that provided the CSR 310. The public key may correspond to a secret private key that is stored at the application that provided the CSR 310. For example, the public key may be used to encrypt data and the corresponding secret private key stored at the application may be used to decrypt the data. The secret private key may be stored at the application (e.g., stored within the execution code of the application). The hash value may be generated by a hash function that is performed on the execution code of the application. For example, a server or other such computing device providing the application may generate the hash value of the application. The attestation value may be generated by a computing environment that is executing the application. In some embodiments, the attestation value may be generated from the processor that is executing the application. For example, the attestation value may be based on information identifying the execution environment of the application. In the same or alternative embodiments, the attestation value may include information from the application. For example, the attestation value may include a hash value of the public key used by the application. Thus, the attestation value may be based on a combination of the computing environment of the application and the public key used by the application. The CSR 310 may further include a network domain of the application. The network domain may be a network domain from which the application may be accessed by other processes or applications.

The digital certificate manager 320 may receive the certificate signing request 310 and may verify the CSR 310. For example, the digital certificate manager 320 may use the public key from the certificate signing request 310 to verify a digital signature of the CSR 310. In some embodiments, the CSR 310 is signed by the secret private key of the application that corresponds to the public key that is included in the CSR 310. The digital certificate manager 320 may include a trusted hash database 321 that identifies known hash values of applications. For example, the trusted hash database 321 may identify an application, a version number of the application, and the corresponding known hash value of the application (e.g., the hash value of the execution code of the application at the version number). The trusted hash database 321 may identify each known hash value for each known application and version number.

In some embodiments, the trusted hash database 321 may further identify one or more policies associated with each application. A policy may set a restriction or condition to a digital certificate that is issued for an application in the trusted hash database 321. In some embodiments, a policy may specify an expiration of an issued digital certificate. For example, the policy may specify an amount of time that may elapse until the digital certificate expires and a new digital certificate is to be requested from the digital certificate manager by the application for which the issued digital certificate expired. In some embodiments, the policy may specify a type of data that may be communicated by using the issued digital certificate. For example, a policy may specify that a first type of data may be encrypted by the public key included in the issued digital certificate and that a different second type of data may not be encrypted by the public key included in the issued digital certificate. In the same or alternative embodiments, the policy may specify types of applications that may use the included public key. For example, an application that operates on data intended to be more secure may be specified by the policy to use the public key while another application that operates on public data may be specified by the policy to not use the public key when communicating with an application that provides the digital certificate.

As shown in FIG. 3, the digital certificate manager 320 may further include a domain database 322. In some embodiments, the domain database 322 may identify network domains for each application in the trusted hash database 321. Each application may be assigned to one or more network domains. The digital certificate manager 320 may further include a certificate authority private key 323 that may be used to sign the issued digital certificate 330. A corresponding CA public key may be stored at each known application in order to verify the signature of the digital certificate manager 320. For example, each application may store the same CA public key that corresponds to verifying a signature signed by the CA private key 323.

Furthermore, the digital certificate manager 320 may include a certificate issuance log 324. In some embodiments, the certificate issuance log 324 may identify when digital certificates are issued to a particular application. The certificate issuance log 324 may further identify when a certificate signing request is received and/or whether a digital certificate is not issued when a hash value in a certificate signing request does not match a known hash value stored in the trusted hash database 321. In some embodiments, the certificate issuance log 324 may identify a number of times that digital certificates have been issued for each application and/or each version number of each application.

In operation, the trusted hash database 321 may be used to determine whether to issue a digital certificate in response to receiving a certificate signing request. Further details are described with regards to FIG. 4.

The digital certificate 330 may be issued by the digital certificate manager in response to receiving the certificate signing request as described in further detail below. The digital certificate 330 may include a public key of the application. For example, the digital certificate 330 may include the public key that was included in the certificate signing request 310 from the application. Furthermore, the digital certificate may include a network domain of the application and a signature of the digital certificate manager. In some embodiments, the digital certificate 330 may further include a policy that specifies one or more conditions for use with the digital certificate 330 as previously described.

Figure 4:
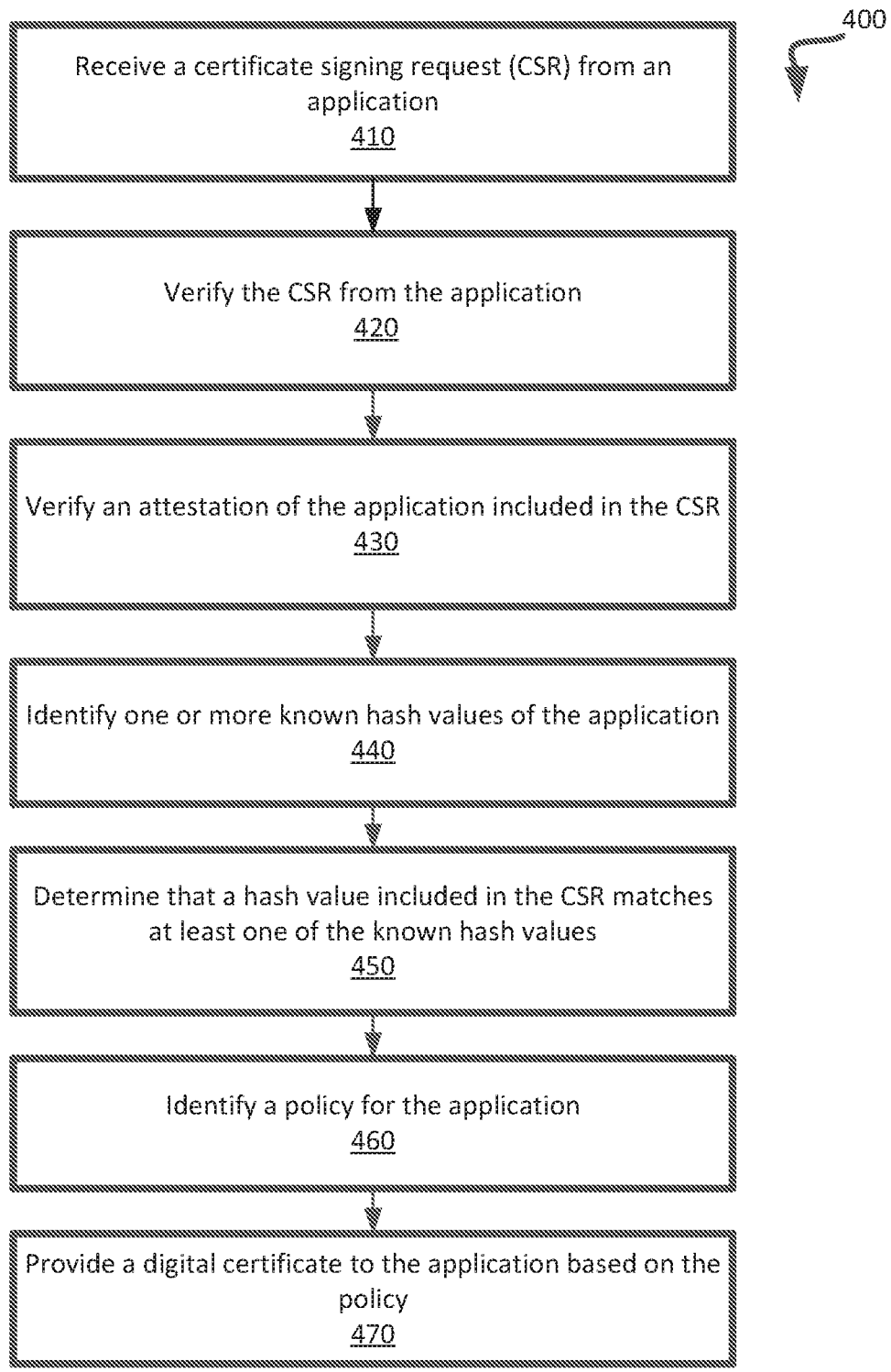
FIG. 4 is a flow diagram of an example method to verify a certificate signing request from an application to issue a digital certificate in accordance with some embodiments of the present disclosure.

FIG. 4 is a flow diagram of an example method 400 to verify a certificate signing request from an application to issue a digital certificate. In general, the method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 may be performed by the digital certificate manager 130 of FIG. 1.

As shown in FIG. 4, the method 400 may begin with the processing logic receiving a certificate signing request from an application (block 410). In some embodiments, the CSR may be received from a process or secure enclave that is executing the application. The processing logic may further verify the CSR from the application (block 420). For example, the certificate signing request may be signed (e.g., include a digital signature) by a private key of the application and may also include the public key that corresponds to the private key. The digital signature of the certificate signing request may thus be verified by the public key that is included in the certificate signing request. The processing logic may further verify an attestation of the application that is included in the CSR (block 430). The attestation may be verified after the digital signature of the certificate signing request has been verified. The digital certificate manager may store known valid attestation values and may compare the attestation of the application included in the CSR with the known valid attestation values. In the same or alternative embodiments, the digital certificate manager may provide the received attestation value to another entity (e.g., another application, secure enclave, and/or network server) to determine whether the received attestation value is valid. The attestation value of the CSR may be valid when the attestation value matches a known valid attestation value. In the same or alternative embodiments, the attestation value of the CSR may be valid when the attestation value matches or is verified based on other information specified in the CSR. For example, the attestation value of the CSR may be valid when the attestation value is verified (and/or matches) based on the public key included in the CSR and/or the hash value of the application. If the attestation value of the CSR is determined to not be valid, then a digital certificate may not be issued. For example, an error message may be provided to the application that provided the CSR specifying that a digital certificate could not be issued as the attestation of the application was unsuccessful. In the same or alternative embodiments, an error message may be provided to the application when the CSR from the application is not verified. The processing logic may further identify one or more known hash values of the application (bock 440). For example, after the attestation value included in the CSR is verified and the CSR has been verified, the known hash values of the application (e.g., for each version of the application) may be identified. The processing logic may further determine that a hash value included in the CSR matches at least one of the known hash values (block 450). For example, the hash value from the CSR may match another hash value previously provided to the digital certificate manager. In some embodiments, the processing logic may further determine that a network domain included in the certificate signing request matches a known network domain of the application that is stored at the digital certificate manager. The processing logic may further identify a policy for the application (block 460). The policy may specify one or more conditions for use with a digital certificate of the application. Subsequently, the processing logic may provide a digital certificate to the application based on the policy (block 470). For example, the digital certificate may be issued to the application with a public key of the application and a specification of the policy.

If the CSR from the application is not verified and/or if the attestation of the application included in the CSR is not verified, then the digital certificate may not be issued to the application. For example, an error message may be returned to the application specifying that the CSR is not verified and/or the attestation is not verified. Furthermore, if the hash value of the application does not match with any known hash value stored at the digital certificate manager, then the digital certificate may not be issued to the application. For example, another error message may be returned to the application specifying that the identity of the application is unknown. In some embodiments, the CSR from the application may not be verified if a network domain included or specified by the CSR does not match or correspond to a known network domain or a valid network domain of the digital certificate manager.

Figure 5:
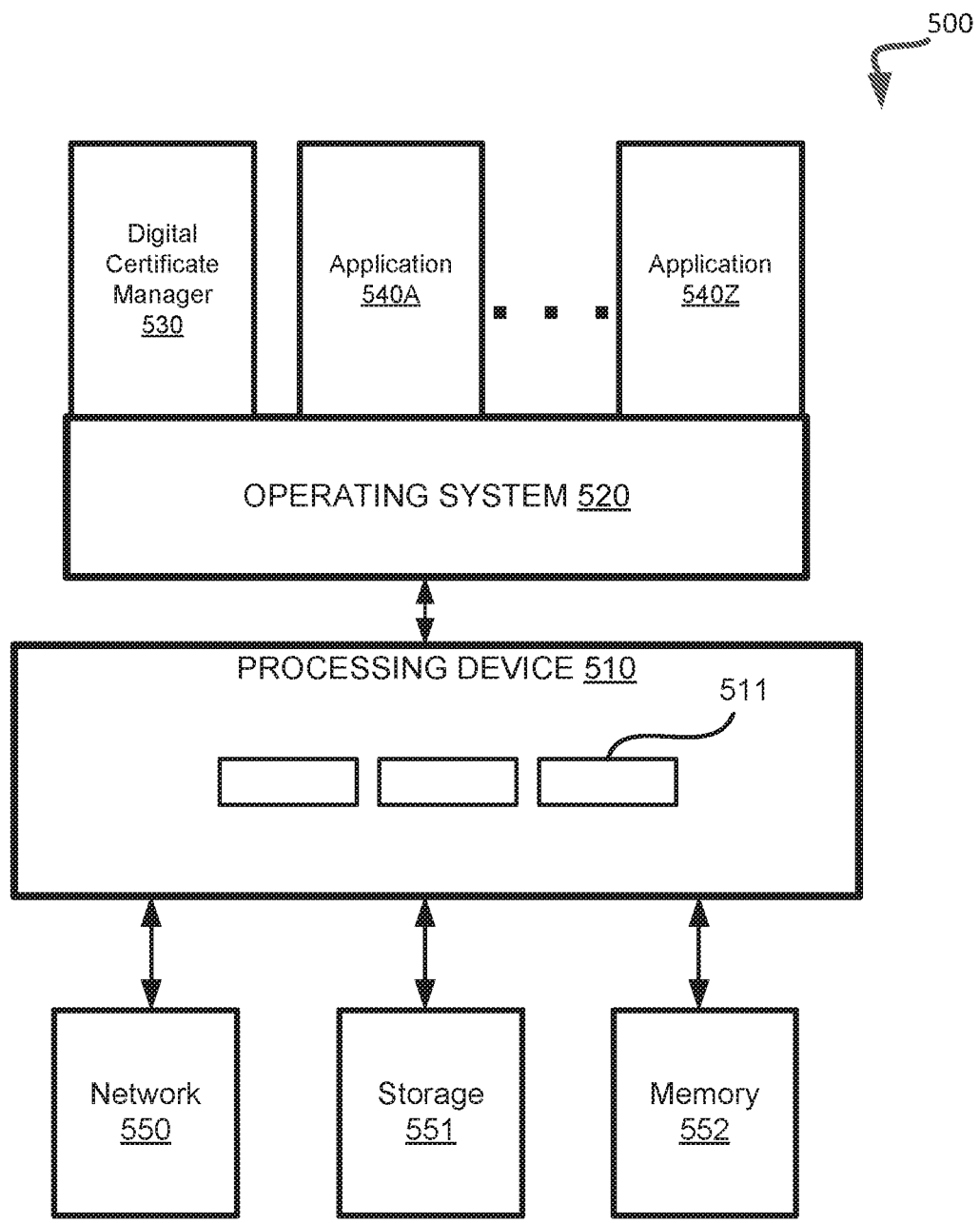
FIG. 5 illustrates an example network server with a digital certificate manager component in accordance with some embodiments of the present disclosure.

FIG. 5 illustrates an example network server 500 for a key management system to provide secure use of a cryptographic key for one or more applications. In general, memory pages may be indexed to provide secure memory access for a network server that provides cryptographic operations for one or more other applications 540A to 540Z that are also hosted by the network server or another network server.

As shown in FIG. 5, the network server 500 may include a processing device 510 that may execute an operating system 520. Furthermore, the processing device 510 may include one or more internal cryptographic keys 511 that may be used to encrypt and decrypt data stored in a portion of a memory that is assigned to a secure enclave of the digital certificate manager 530. The access to the data of the digital certificate manager 530 in the secure enclave (e.g., data stored at a storage resource) may be protected from the one or more applications 540A to 540Z and the operating system 520. For example, the access to the data of the secure enclave corresponding to the digital certificate manager 530 may be protected by the use of one of the internal cryptographic keys 511 that are internal to the processing device 510 so that the access to the data is based on a hardware access as opposed to a software access. The operating system 520 may be associated with a first privilege level and the digital certificate manager 530 and the applications 540A to 540Z may be associated with a second privilege level where the first privilege level of the operating system is more privileged than the second privilege level of the various applications that are run on the operating system 520 (e.g., the more privileged level allows access to more resources of the network server than the less privileged level). Thus, the operating system 520 may be allowed access to resources of the applications 540A to 540Z. However, since the digital certificate manager 530 is assigned to a secure enclave where access to the data of the secure enclave is based on the use of an internal cryptographic key 511 of the processing device 511, the operating system 520 may not be able to access the data of the digital certificate manager 530 despite having a more privileged level of access than the digital certificate manager 530. The master key that is used to decrypt data at the storage resource may be an internal cryptographic key 511.

In operation, the digital certificate manager 530 may be hosted on the network server with the applications 540A to 540Z. The application 540A may perform a function that may use a cryptographic operation with a cryptographic key. The application 540A may provide a corresponding cryptographic key to the application 540Z by using a digital certificate from the digital certificate manager 530 as previously described.

As such, a network server may run a digital certificate manager 530 and an application that may use the digital certificate manager 530 for managing the use of digital certificates. Although FIG. 5 illustrates that the digital certificate manager 530 may provide digital certificates for an application 540A to 540Z on the same network server, the digital certificate manager 530 may alternatively be hosted by another network server or may be hosted by another network server that is external to any data center or network cluster that includes the network servers hosting applications 540A to 540Z.

Figure 6:
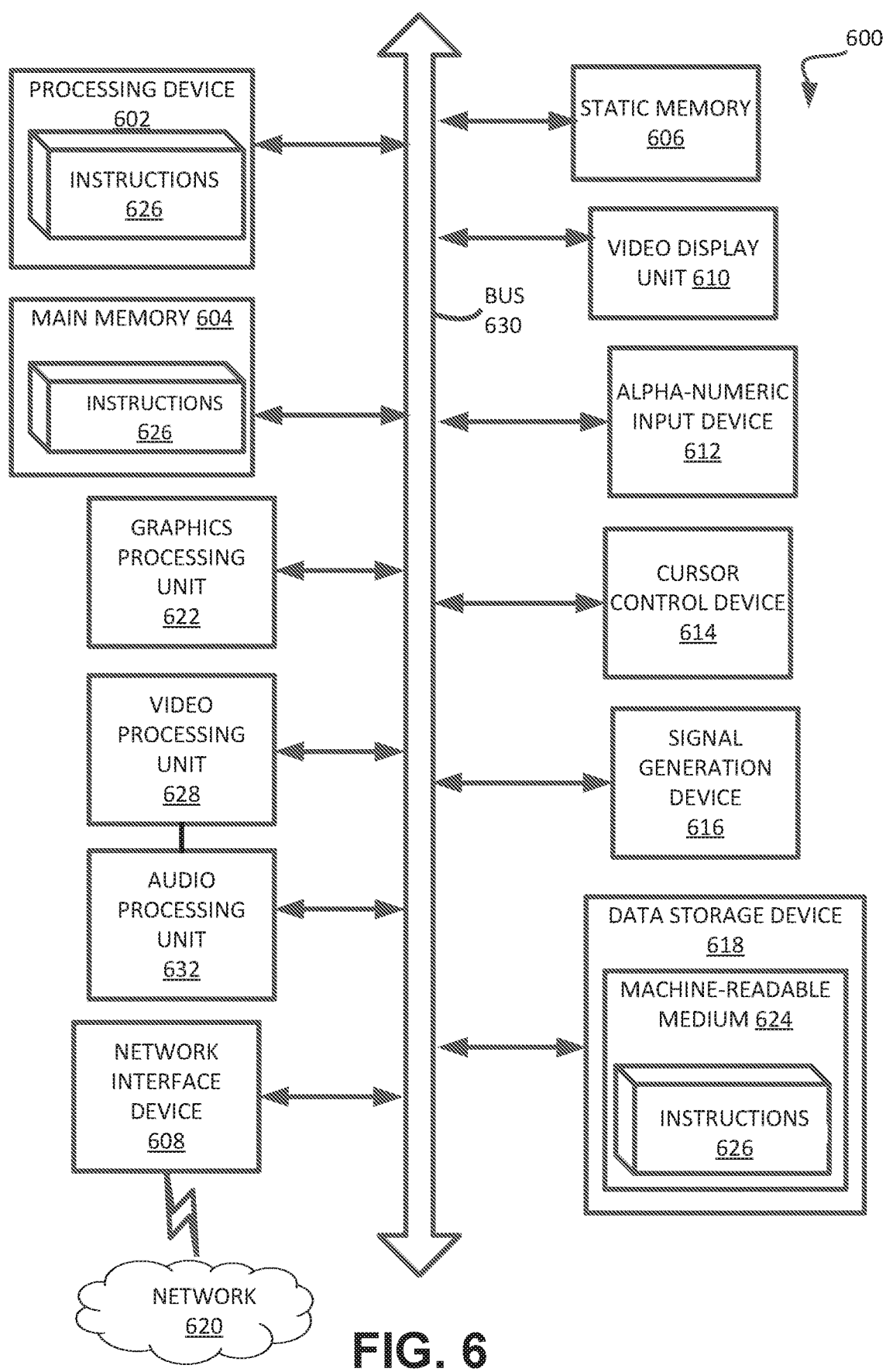
FIG. 6 illustrates an example computer system in which embodiments of the present disclosure operate.

FIG. 6 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a computer-readable medium) on which is stored one or more sets of instructions or software 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In one implementation, the instructions 626 include instructions to implement functionality as described herein. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing certain terms may refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
   receiving a request to issue a digital certificate, wherein the request includes a specified hash value generated from execution code of a requesting application that has provided the request for the digital certificate, and the request further includes an identification of a network domain of the requesting application;
   receiving at least one data structure comprising a plurality of hash values, wherein each of the hash values is associated by the data structure with a particular application and a particular network domain, wherein the hash value associated with each particular application is generated from execution code of the corresponding particular application;
   determining whether the specified hash value corresponding to the requesting application matches with a known hash value associated with one of the particular applications to determine whether the execution code of the requesting application has changes as compared to execution code of the one of the particular applications, wherein the known hash value is from the plurality of hash values, and the network domain of the requesting application matches with a known network domain associated with the known hash value; and
   in response to determining that the specified hash value corresponding to the requesting application matches with the known hash value and the network domain of the requesting application matches with the known network domain, issuing, by a processing device of a digital certificate manager, the digital certificate to the requesting application.

2. The method of claim 1, further comprising:
   in response to determining that the specified hash value corresponding to the requesting application does not match with the known hash value, determining to not issue the digital certificate to the requesting application.

3. The method of claim 1, wherein the digital certificate includes a public key of the requesting application and a signature associated with a private key of a certificate authority that corresponds to the digital certificate manager, wherein the digital certificate is issued by the certificate authority to the requesting application.

4. The method of claim 1, further comprising:
   receiving an indication of a subsequent hash value of the requesting application, the subsequent hash value being received when execution code of the requesting application has been updated; and
   storing the subsequent hash value at the digital certificate manager, the subsequent hash value being used to compare with another hash value in a subsequent request for another digital certificate from the requesting application.

5. The method of claim 1, wherein each of the hash values is further associated with a particular version of the particular application associated with the hash value.

6. The method of claim 1, further comprising:
   identifying an attestation value of the requesting application, the attestation value corresponding to a computing environment providing the requesting application; and
   verifying the attestation value of the requesting application, wherein the issuing of the digital certificate is further based on the verification of the attestation value of the requesting application.

7. A system comprising:
a memory; and
a processing device, operatively coupled with the memory, to:
   receive a request to issue a digital certificate, wherein the request includes a specified hash value generated from execution code of a requesting application that has provided the request for the digital certificate, and the request further includes an identification of a network domain of the requesting application;
   receive at least one data structure comprising a plurality of hash values, wherein each of the hash values is associated by the data structure with a particular application and a particular network domain, wherein the hash value associated with each particular application is generated from execution code of the corresponding particular application;
   determine whether the specified hash value corresponding to the requesting application matches with a known hash value associated with one of the particular applications to determine whether the execution code of the requesting application has changes as compared to execution code of the one of the particular applications, wherein the known hash value is from the plurality of hash values and the network domain of the requesting application matches with a known network domain associated with the known hash value; and
   in response to determining that the specified hash value corresponding to the requesting application matches with the known hash value and the network domain of the requesting application matches with the known network domain, issue, by a digital certificate manager, the digital certificate to the requesting application.

8. The system of claim 7, wherein the processing device is further to:
   in response to determining that the specified hash value corresponding to the requesting application does not match with the known hash value, determine to not issue the digital certificate to the requesting application.

9. The system of claim 7, wherein the digital certificate includes a public key of the requesting application and a signature associated with a private key of a certificate authority that corresponds to the digital certificate manager, wherein the digital certificate is issued by the certificate authority to the requesting application.

10. The system of claim 7, wherein the processing device is further to:
   receive an indication of a subsequent hash value of the requesting application, the subsequent hash value being received when execution code of the requesting application has been updated; and
   store the subsequent hash value at the digital certificate manager, the subsequent hash value being used to compare with another hash value in a subsequent request for another digital certificate from the requesting application.

11. The system of claim 7, wherein each of the hash values is further associated with a particular version of the particular application associated with the hash value.

12. A non-transitory computer readable medium comprising data that, when accessed by a processing device, cause the processing device to perform operations comprising:
   receiving a request to issue a digital certificate, wherein the request includes a specified hash value generated from execution code of a requesting application that has provided the request for the digital certificate, and the request further includes an identification of a network domain of the requesting application;
   receiving at least one data structure comprising a plurality of hash values, wherein each of the hash values is associated by the data structure with a particular application and a particular network domain, wherein the hash value associated with each particular application is generated from execution code of the corresponding particular application;
   determining whether the specified hash value corresponding to the application matches with a known hash value associated with one of the particular applications to determine whether the execution code of the requesting application has changes as compared to execution code of the one of the particular applications, wherein the known hash value is from the plurality of hash values and the network domain of the requesting application matches with a known network domain associated with the known hash value; and
   in response to determining that the specified hash value corresponding to the requesting application matches with the known hash value and the network domain of the requesting application matches with the known network domain, issuing, by the processing device of a digital certificate manager, the digital certificate to the requesting application.

13. The non-transitory computer readable medium of claim 12, wherein the operations further comprise:
   in response to determining that the specified hash value corresponding to the requesting application does not match with the known hash value, determining to not issue the digital certificate to the requesting application.

14. The non-transitory computer readable medium of claim 13, wherein the digital certificate includes a public key of the requesting application and a signature associated with a private key of a certificate authority that corresponds to the digital certificate manager, wherein the digital certificate is issued by the certificate authority to the requesting application.

15. The non-transitory computer readable medium of claim 12, wherein each of the hash values is further associated with a particular version of the particular application associated with the hash value.

16. The non-transitory computer readable medium of claim 12, wherein the operations further comprise:
   receiving an indication of a subsequent hash value of the requesting application, the subsequent hash value being received when execution code of the requesting application has been updated; and
   storing the subsequent hash value at the digital certificate manager, the subsequent hash value being used to compare with another hash value in a subsequent request for another digital certificate from the requesting application.

* * * * *